Jan. 15, 1929.  W. H. RHODA  1,699,450

BALL BEARING

Filed Sept. 29, 1925

Inventor
William H. Rhoda
By Watson E. Coleman
Attorney

Patented Jan. 15, 1929.

1,699,450

UNITED STATES PATENT OFFICE.

WILLIAM H. RHODA, OF LAKELAND, FLORIDA.

BALL BEARING.

Application filed September 29, 1925. Serial No. 59,383.

This invention relates to improvements in ball bearings and has for an important object thereof the provision of an adjustable ball bearing, the races of which may be altered in size to compensate for wear occurring upon the balls or race in the use of the bearing.

An important object of the invention is to provide a device of this character which may be cheaply and readily produced and which may be very readily adjusted without removing the bearing from its position.

A more specific object of the invention is to provide ball bearings, the races of which are constructed in separable sections having means whereby these sections may be adjusted to vary the size of the race provided upon relative rotation thereof together with means for locking the sections in adjusted position removable and insertible and without disturbing the balls of the bearing.

These and other objects I attain by the construction shown in the accompanying drawing, wherein for the purpose of illustration is shown a preferred embodiment of my invention and wherein:—

Figure 1:
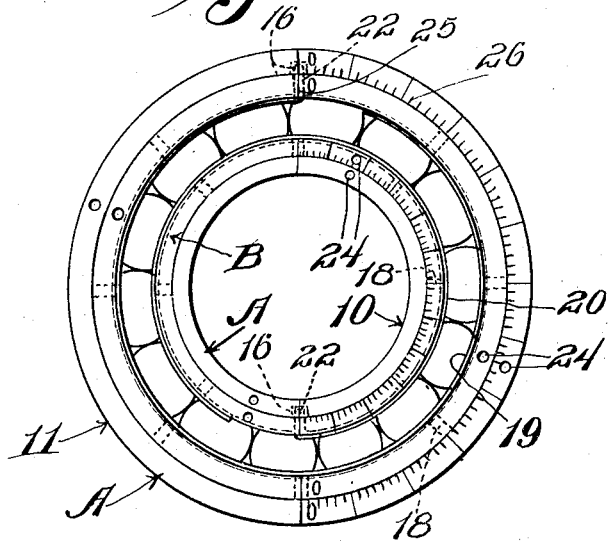
Figure 1 is a plan view of a ball bearing constructed in accordance with my invention.
Figure 2:
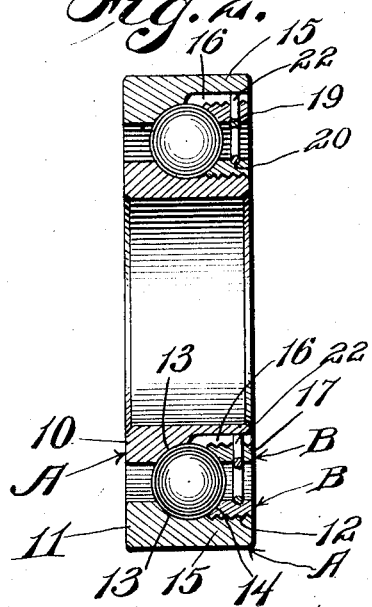
Figure 2 is a vertical sectional view therethrough.
Figure 3:
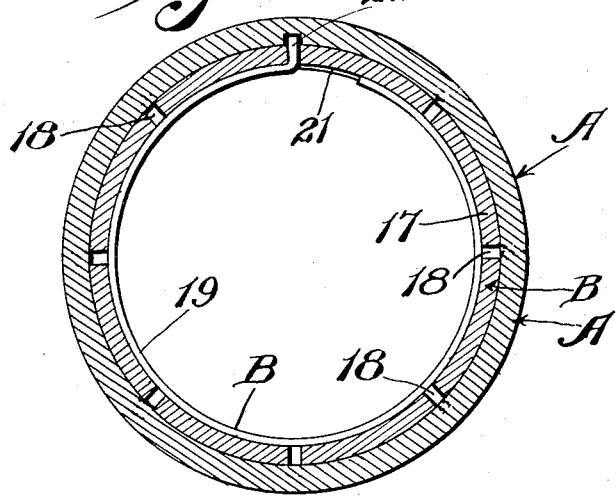
Figure 3 is a transverse sectional view through the outer race member of the bearing.
Figure 4:
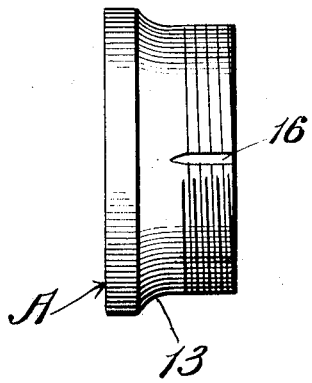
Figure 4 is a side elevation of the main section of the outer race member.
Figure 5:
Figure 5 is a sectional view through the complementary member of the race.

Referring now more particularly to the drawing, the numerals 10 and 11 designate the inner and outer base members of a ball bearing constructed in accordance with my invention. In accordance with my invention, each race member 10 and 11 is formed in two sections A and B having threaded engagement with one another at 12. The section A or main section, in each instance, has its inner face or that face bearing the ball race formed with one side 13 of the ball race and the threaded section 12 for receiving the complementary section B which bears the other portion 14 of the race. By adjusting these sections toward one another, the size of the race provided may be reduced to compensate for wear.

In order to permit this adjustment and at the same time to lock the sections in adjusted positions, the threaded portion 15 of the main section A is, in each instance, provided in its face with a groove 16 paralleling the axis of the bearing. The body 17 of the complementary section B is provided with a plurality of circumferentially spaced openings 18 radial to the axis of the bearing. These openings may be provided in any desired number and are uniformly spaced from one another. The preferred spacing is such that the openings are spaced from one another forty-five degrees about the circumference of the complementary section.

A locking band 19 or 20 is provided, this locking band being, in each instance, in the form of a spring wire insertible in a groove 21 formed in the inner face of the complementary member and of such length that it extends substantially entirely about the inner face of the complementary member within this groove. One end of this band is provided with an inturned radially directed anchor 22 of sufficient length to project entirely through the complementary section and engage in the groove 16.

It will be obvious that these anchors, being of a length less than the distance between adjacent faces of the complementary sections B of the respective race members, may be removed at any time and the sections A and B of the race member adjusted to take up lost motion in the bearing. In order to facilitate such adjustment, the end faces of the sections A and B are provided with openings 24 for the reception of a wrench or the like and are further provided with coacting graduations 25 and 26, respectively, whereby the amount of adjustment may be readily determined and the sections of the races accordingly correspondingly adjusted.

It will furthermore be obvious that the construction hereinbefore set forth is obviously capable of a certain range of change and modification without materially departing from the spirit of the invention and I accordingly do not limit myself to such specific structure except as hereinafter claimed.

I claim:—

A ball bearing comprising coacting race members each including main and complementary sections having threaded engagement with one another, each of said sections bearing one-half of the race of the member whereby by relatively rotating said sections.

the effective size of the race may be reduced and means for locking the sections against rotation in adjusted positions comprising a spring ring associated with one of said sections, the section having a plurality of openings therein and provided upon its inner face with an annular groove communicating with the ends of said openings, said annular groove receiving said ring, the other of the sections having in its threaded face a groove paralleling the axis of the section, said spring having an angular portion to extend through one of said openings and engage in said groove, said angular portions being of less length than the distance between adjacent faces of the race members to thereby permit location of said rings at the inner faces of the race members and in the annular groove.

In testimony whereof I hereunto affix my signature.

WILLIAM H. RHODA.